(12) United States Patent
Böhringer et al.

(10) Patent No.: US 8,366,816 B2
(45) Date of Patent: *Feb. 5, 2013

(54) ADSORPTION FILTER MATERIAL WITH INTEGRATED PARTICLE- AND/OR AEROSOLFILTERING FUNCTION AND ITS USE

(75) Inventors: Bertram Böhringer, Wuppertal (DE); Stefan Kamper, Ratingen (DE)

(73) Assignee: Blucher GmbH, Erkrath (DE)

( * ) Notice: Subject to any disclaimer, the term of this patent is extended or adjusted under 35 U.S.C. 154(b) by 424 days.

This patent is subject to a terminal disclaimer.

(21) Appl. No.: 12/664,204

(22) PCT Filed: Apr. 24, 2008

(86) PCT No.: PCT/EP2008/003306
§ 371 (c)(1),
(2), (4) Date: Dec. 11, 2009

(87) PCT Pub. No.: WO2008/151692
PCT Pub. Date: Dec. 18, 2008

(65) Prior Publication Data
US 2010/0162895 A1      Jul. 1, 2010

Related U.S. Application Data

(63) Continuation-in-part of application No. 11/710,777, filed on Feb. 26, 2007, now Pat. No. 8,062,411.

(30) Foreign Application Priority Data

Jun. 11, 2007 (DE) .......................... 10 2007 027 399
Jul. 13, 2007 (DE) .......................... 10 2007 033 178

(51) Int. Cl.
*B01D 53/02* (2006.01)
(52) U.S. Cl. .................. 96/134; 96/154; 55/486; 2/457

(58) Field of Classification Search .................... 96/108, 96/134, 135; 55/315, 318; 2/457
See application file for complete search history.

(56) References Cited

U.S. PATENT DOCUMENTS

| 4,824,451 A | * | 4/1989 | Vogt et al. ........................ 55/528 |
| 5,350,443 A | * | 9/1994 | von Blucher et al. ........... 96/135 |
| 5,609,947 A | * | 3/1997 | Kamei et al. .................. 428/212 |

(Continued)

FOREIGN PATENT DOCUMENTS

| DE | 10 2005 056 537 A1 | 5/2007 |
| DE | 10 2006 021 905 A1 | 9/2007 |

(Continued)

*Primary Examiner* — Duane Smith
*Assistant Examiner* — Christopher P Jones
(74) *Attorney, Agent, or Firm* — Edward E. Sowers; Brannon Robinson PC

(57) ABSTRACT

The invention provides an adsorptive filtering material endowed with integrated particle and/or aerosol protection and with protective performance with regard to biological and/or chemical noxiants, in particular biological and/or chemical warfare agents, the adsorptive filtering material having a multilayered construction comprising a carrier layer, an adsorptive layer assigned to and preferably fixed to the carrier layer, and optionally a covering layer disposed on that side of the adsorptive layer that is remote from the carrier layer, wherein the adsorptive filtering material is additionally equipped with a particle and/or aerosol filtering layer which is preferably disposed between the adsorptive layer and the covering layer, wherein the particle and/or aerosol filtering layer is embodied as an air pervious textile fabric formed from fibers. The adsorptive filtering material is particularly useful in NBC protective materials of any kind (e.g. NBC protective apparel) and for producing filters.

21 Claims, 1 Drawing Sheet

U.S. PATENT DOCUMENTS

| | | |
|---|---|---|
| 6,641,773 B2 | 11/2003 | Kleinmeyer et al. |
| 8,062,411 B2 * | 11/2011 | von Blucher et al. ........... 96/135 |
| 2004/0116025 A1 * | 6/2004 | Gogins et al. ................. 442/340 |
| 2006/0018798 A1 * | 1/2006 | Sakaino et al. ............... 422/101 |
| 2007/0240576 A1 * | 10/2007 | von Blucher et al. ........... 96/154 |

FOREIGN PATENT DOCUMENTS

| | | |
|---|---|---|
| EP | 1 433 394 A1 | 6/2004 |
| EP | 1 618 938 A1 | 1/2006 |
| EP | 1 825 899 A1 | 8/2007 |

* cited by examiner

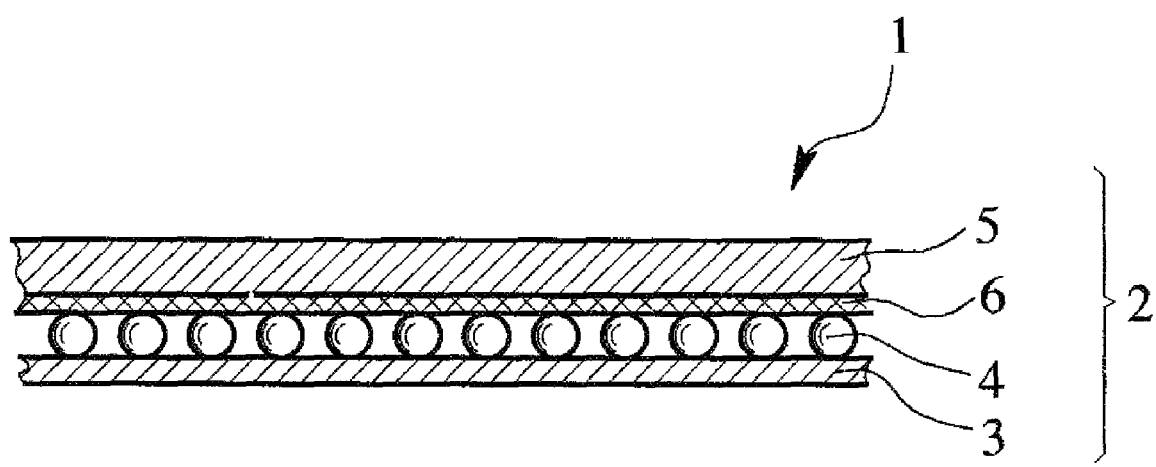

ADSORPTION FILTER MATERIAL WITH INTEGRATED PARTICLE- AND/OR AEROSOLFILTERING FUNCTION AND ITS USE

CROSS-REFERENCES TO RELATED APPLICATIONS

This application is a continuation-in-part of and claims priority to utility patent application Ser. No. 11/710,777 filed Feb. 26, 2007, published as U.S. Patent Pub. No. 2007/0240576, and as U.S. Pat. No. 8,062,411.

BACKGROUND OF THE INVENTION

The present invention relates to an adsorptive filtering material with integrated particle and/or aerosol protection and with protective performance with regard to biological and/or chemical noxiants, in particular biological and/or chemical warfare agents, as classified in the preamble of patent claim 1 and to its use, in particular for producing protective materials of any kind, in particular NBC protective apparel, and also filters and filtering materials of any kind. The present invention further relates to the protective materials, in particular protective apparel (for example NBC protective garments), and also filters and filtering materials themselves that are produced using the adsorptive filtering material of the present invention.

There are a number of entities which are absorbed by the skin and lead to serious physical noxae. Examples include the vesicatory Hd (also known as Yellow Cross and mustard gas) and the nerve gas sarin. People liable to come into contact with such poisons have to wear a suitable protective suit, or be protected against these poisons by suitable protective materials.

There are in principle three types of protective suits: the air and water vapor impervious protective suits, which are equipped with a rubber layer which is impervious to biological and chemical poisons, and very rapidly lead to a heat build-up for the wearer; protective suits equipped with a membrane which transmits water vapor but not biological and chemical poisons; and air and water vapor pervious protective suits, which offer the highest wear comfort.

NBC protective apparel is thus traditionally produced either from impermeable systems (for example suits from butyl rubber or suits with membrane) or permeable, air pervious adsorptive filtering systems in particular based on activated carbon (for example pulverulent carbon, activated carbon fiber materials or spherocarbon, etc.).

Whereas the air impervious membrane suits lead on the one hand to relatively good protection against chemical and biological poisons such as warfare agents or the like, and on the other, owing to the air imperviousness or impermeability of the membrane, also offer protective performance with regard to aerosols and noxiant particles, the permeable, air pervious adsorptive protective suits do offer very good protection in relation to chemical poisons, but often only inadequate protection in relation to aerosols and noxiant particles.

To improve biological protection, the permeable, adsorptive filtering systems, in particular based on activated carbon, are often endowed with a catalytically active component, or a catalyst, by impregnating the activated carbon with a biocidal or biostatic catalyst, in particular based on metals or metal compounds. However, this does not solve the problem of poor protective performance with regard to noxiant aerosols (for example finely dispersed chemical noxiants, in particular warfare agents) or noxiant particles (for example noxiant microorganisms or microorganisms fixed on carrier particles, for example viruses or bacteria used as biological warfare agents).

BRIEF SUMMARY OF THE INVENTION

The present invention therefore has for its object to provide an adsorptive filtering material, or a protective material, that at least substantially avoids or else at least ameliorates the above-described disadvantages of the prior art. In particular, such an adsorptive filtering or protective material should be suitable in particular for the production of NBC protective materials of any kind, for example NBC protective apparel and the like, and also of filter and filtering materials.

The present invention further has for its object to provide a permeable, in particular gas or air pervious adsorptive filtering or protective material which provides protection not only in relation to chemical and/or biological poisons or noxiants, in particular chemical warfare agents, but also with regard to noxiant particles and/or aerosols.

A particular object of the present invention is to develop the adsorptive filtering material with integrated particle and/or aerosol protection and with protective performance with regard to biological and/or chemical noxiants which is described in the German Patent Application DE 10 2006 021 905.8 of May 11, 2006.

The problem described above is solved in the realm of the present invention by an adsorptive filtering material according to patent claim 1. Further, advantageous embodiments of the adsorptive filtering material of the present invention form the subject matter of the respective subclaims.

The present invention further provides for the use of the adsorptive filtering material according to the present invention for producing protective materials of any kind, in particular protective apparel, in particular for the civil or military sector, such as protective suits, protective gloves, protective shoewear, protective socks, head protective apparel and the like, and of protective coverings of any kind, preferably for NBC deployment, and also to the thus produced protective materials of the aforementioned kind themselves.

The present invention finally provides for the use of the adsorptive filtering material according to the present invention for producing filters and filtering materials of any kind, in particular for removing noxiant, odorant and toxicant entities of any kind, in particular from air and/or gas streams, such as NBC respirator filters, odor filters, sheet filters, air filters, in particular filters for indoor air cleaning, adsorption-capable support structures and filters for the medical sector and also the thus produced filter and filtering materials of the aforementioned kind themselves.

The present invention accordingly provides—in accordance with a first aspect of the present invention—an adsorptive filtering material with integrated particle and/or aerosol protection (i.e. with integrated particle and/or aerosol filtering function) and with protective performance with regard to biological and/or chemical noxiants, in particular biological and/or chemical warfare agents, the adsorptive filtering material having a multilayered construction, the multilayered construction comprising
  a carrier layer,
  an adsorptive layer assigned to and preferably fixed to the carrier layer,
  optionally a covering layer disposed on that side of the adsorptive layer that is remote from the carrier layer, and
  a particle and/or aerosol filtering layer, preferably a particle and aerosol filtering layer, wherein the particle and/or aerosol filtering layer is embodied as an air pervious textile fabric formed from fibers having fiber diameters in the range from 10 nm to 5 μm, preferably 100 nm to 1.1 μm, and preferably having an areal weight in the range from 1 to 75 g/m$^2$, in particular 2 to 50 g/m$^2$ and more preferably 5 to 15 g/m$^2$.

In other words, the present invention as per this aspect of the present invention provides an adsorptive filtering material with integrated particle and/or aerosol protection and with protective performance with regard to biological and/or chemical noxiants, in particular biological and/or chemical warfare agents, which constitutes a further development of the invention underlying the German Patent Application DE 10 2006 021 905.8 of May 11, 2006 and wherein the particle and/or aerosol filtering layer is embodied as an air pervious textile fabric formed from fibers having fiber diameters in the range from 10 nm to 5 μm, preferably 100 nm to 1.1 μm, and preferably having an areal weight in the range from 1 to 75 g/m$^2$, in particular 2 to 50 g/m$^2$ and more preferably 5 to 15 g/m$^2$.

It is thus a fundamental idea of the present invention to improve the DE 10 2006 021 905.8 adsorptive filtering materials of multilayered construction and equipped with an additional particle and/or aerosol protective function integrated in the adsorptive filtering material on the basis of a particle and/or aerosol filtering layer, preferably particle and aerosol filtering layer, included or incorporated in the adsorptive filtering material itself with regard to particle and aerosol protection efficiently by using as particle and/or aerosol filtering layer an air pervious textile fabric formed from fibers having fiber diameters in the range from 10 nm to 5 μm, preferably 100 nm, to 1.1 μm, and preferably having an areal weight in the range from 1 to 75 g/m$^2$, in particular 2 to 50 g/m$^2$, more preferably 5 to 15 g/m$^2$. This is because the applicant has found that, surprisingly, this is an effective way of improving/optimizing aerosol and particle protection.

This makes it possible to achieve an effective enhancement/improvement of the aerosol and particle protection afforded by adsorptive filtering systems, in particular those based on textile materials to which activated carbon has been applied preferably in particulate form. As will be more particularly described hereinbelow, thus constructed filtering systems/materials reliably and efficiently retain for example aerosols of oils, salts, dusts, etc. with an efficiency of above 90%, preferably 99% or more.

BRIEF DESCRIPTION OF THE DRAWINGS

FIG. 1 shows a schematic sectional depiction through the layered construction of an inventive adsorptive filtering material in accordance with an embodiment of the present invention whereby the adsorptive layer is formed of discrete adsorber particles, in particular activated carbon particles.

DETAILED DESCRIPTION OF THE INVENTION

In general, the particle and/or aerosol filtering layer is disposed directly on the adsorptive layer, in particular fixed on or to the adsorptive layer, preferably laminated hereon. In other words, therefore, the particle and/or aerosol filtering layer is generally disposed between the adsorptive layer and the covering layer (i.e. the layer which in the use state is the outer or outside layer, for example an outerwear fabric), i.e. the particle and/or aerosol filtering layer is generally disposed on that side of the adsorptive layer that is remote from the carrier layer, wherein the particle and/or aerosol filtering layer is usually fixed directly on/to the adsorptive layer (for example by lamination or by preferably discontinuous adhering, preferably by lamination), preferably by means of lamination, or else alternatively the particle and/or aerosol filtering layer is fixed on/to the covering layer or else on/to the covering layer and the adsorptive layer (for example by lamination or by preferably discontinuous adhering, preferably by lamination). In the use state of the adsorptive filtering material according to the present invention, the covering layer is the outside layer (for example outerwear fabric) which faces the noxiant side, so that the noxiant-containing stream of, for example, biological and/or chemical warfare agents which is to be decontaminated first passes through the covering layer and then impinges upon the particle and/or aerosol filtering layer, whereby particles and/or aerosols are retained, and then the chemical and/or biological noxiants, in particular warfare agents, still remaining in the stream impinge on the subsequent adsorptive layer whereby they are then adsorbed and rendered harmless.

As written above, the particle and/or aerosol filtering layer is advantageously fixed directly on or to the adsorptive layer (for example by lamination or by preferably discontinuous adhering, preferably by lamination). Alternatively, the particle and/or aerosol filtering layer may, however, also be fixed on or to the covering layer or else on or to the covering layer and the adsorptive layer (for example by lamination or by preferably discontinuous adhering, preferably by lamination).

Owing to the aforementioned multilayered construction, the adsorptive filtering material of the present invention combines in a single material not only an efficient particle and/or aerosol protection but also an efficient protection with regard to biological and/or chemical noxiants, in particular biological and/or chemical warfare agents.

The protective performance offered by the adsorptive filtering material of the present invention with regard to particles and aerosols is comparable to conventional membrane systems; but the gas perviousness, in particular air perviousness, or permeability, of the adsorptive filtering material of the present invention means that the wear comfort of NBC protective suits made thereof is distinctly enhanced compared with membrane suits.

The particle and/or aerosol filtering layer is generally embodied as an air pervious textile fabric based on a laid or bonded fabric, in particular on a nonwoven, more preferably as a nonwoven. It is preferable according to the present invention for the particle and/or aerosol filtering layer to be produced by electrospinning, meltblow process or a combination of these two processes; this is because, unexpectedly, such materials do provide the best results with regard to aerosol and particle protection coupled with good air perviousness and low areal weight.

The term nonwovens or nonwoven fabrics herein refers in particular to the flexible, porous fabrics classified as bonded fabrics in that they are not produced by the classic methods of interweaving of warp and weft or by interlooping, but by intertanglement and/or cohesive and/or adhesive interbonding of textile fibers. Nonwovens are generally looser materials composed of staple fibers or filaments, in particular synthetic (manufactured) fibers (for example polypropylene, polyester, viscose, etc.) whose coherency is generally due to the fibers' autoadhesion. The individual fibers can have a preferential direction (so-called oriented or crosslaid nonwovens) or else be undirected (so-called random nonwovens). Nonwovens can be mechanically consolidated by needling, intermeshing or by entangling using sharp jets of water (so-called spunlaced nonwovens). Nonwovens particularly useful for the purposes of the present invention can be produced for example by spunbonding, meltblow processes and preferably by electrospinning (cf. for example U.S. Pat. No. 6,641,773 B2). Adhesively consolidated nonwovens are formed by interadhering the fibers with liquid binders (for example acrylate polymers, SBR/NBA, polyvinyl esters or polyurethane dispersions) or by melting or dissolving so-called binder fibers mixed to the nonwoven in the course of its production. In cohesive consolidation, fiber surfaces are solubilized by suitable chemicals and conjoined by pressure or welded together at elevated temperature. Spunbonded nonwovens are fabrics formed by spinning and subsequent laying down, blowing or alluviating onto a transport belt. Nonwovens containing additional threads, wovens or formed-loop knits are deemed reinforced nonwovens. Owing to the multiplicity of available raw materials, possible combinations and techniques of improvement, nonwovens or nonwoven fabrics can be produced in a specific manner to have any desired properties specific to a particular purpose. Like all textiles, nonwoven fabrics or nonwovens can be subjected to the operations of textile dyeing and finishing. For further details concerning the concept of nonwovens and nonwoven fabrics reference may be made for example to Römpp Chemielexikon, 10th edition, Georg Thieme Verlag Stuttgart/New York, Volume 6, 1999, pages 4889/4890, headword: "Vliesstoffe", whose entire disclosure content, including the references cited therein, is hereby incorporated herein by reference.

The areal weight of the particle and/or aerosol filtering layer used in accordance with the present invention can vary within wide limits. As described previously, the areal weight of the particle and/or aerosol filtering layer used in accordance with the present invention is generally in the range from 1 to 75 g/m$^2$ and in particular in the range from 2 to 50 g/m$^2$ and more preferably in the range from 5 to 15 g/m$^2$. However, it may be preferable or necessary depending on a particular planned use or an individual case to deviate from the aforementioned values without leaving the realm of the present invention.

Particularly good particle and/or aerosol collection rates are achieved when the particle and/or aerosol filtering layer used is a textile fabric, preferably nonwoven, consisting of textile fibers having an average diameter in the range from 10 nm to 5 µm, preferably 100 nm to 1100 nm and more preferably 100 to 1000 nm. Suitable textile fabrics, in particular nonwovens, having the aforementioned textile fiber diameters are obtainable for example in the meltblow or preferably in the electrospinning process.

In particular, the particle and/or aerosol filtering layer is constructed as a textile fabric consisting of textile fibers and having pores or meshes bounded by the textile fibers. The individual textile fibers thus bound the meshes (in the case of wovens for example) or pores (in the case of nonwovens for example). The textile fabric should have an average pore size or mesh size—depending on the nature of the textile fabric—of not more than 200 µm, in particular not more than 100 µm, preferably not more than 75 µm, more preferably not more than 50 µm, very particularly preferably not more than 40 µm and even more preferably not more than 10 µm. This provides a particularly good collection rate in relation to particles and/or aerosols to be rendered harmless.

As Applicant has surprisingly found, the performance capability of the particle and/or aerosol filtering layer when the particle and/or aerosol filtering layer is a textile fabric of the aforementioned kind as consists of textile fibers and has pores or meshes bounded by textile fibers is decisively dependent also on the ratio of the average pore or mesh size to the average diameter of the textile fibers. In general, the ratio of the average pore or mesh size to the average diameter of the textile fibers should be in the range from 0.1 to 2000, in particular in the range from 1 to 500, preferably in the range from 5 to 350, more preferably in the range from 10 to 300 and most preferably in the range from 25 to 250. In particular, the ratio of the average pore or mesh size to the average diameter of the textile fibers should be not more than 2000, in particular not more than 500, preferably not more than 350, more preferably not more than 300 and most preferably not more than 250. However, the ratio of the average pore or mesh size to the average diameter of the textile fibers should be at least 0.1, in particular at least 1, preferably at least 5, more preferably at least 10, even more preferably at least 25 and yet even more preferably at least 40. This provides particularly efficient collection rates in relation to the particles and aerosols that are to be rendered harmless.

As observed above, the particle and/or aerosol filtering layer is generally a textile fabric consisting of textile fibers and preferably is a nonwoven. The textile fibers used are synthetic fibers (also referred to by the synonym of manufactured fibers), in particular those textile fibers which may be processed or used in the context of the production process for the textile fabric, in particular in the context of the meltblow process or electrospinning. Textile fibers which are suitable in accordance with the present invention and of which the textile fabric forming the particle and/or aerosol filtering layer consists are for example selected from the group of polyesters (PES); polyolefins, such as polyethylene (PE), polypropylene (PP), polyoxyethylene and polyoxypropylene; polyvinyl chlorides (CLF); polyvinylidene chlorides (CLF); acetates (CA); triacetates (CTA); polyacrylic (PAN), in particular polyacrylonitriles; polyamides (PA); polyvinyl alcohol (PVAL); polyurethanes; polyvinyl esters; poly(meth)acrylates; polyvinylidene fluorides (PVDFs); and also mixtures thereof. Particular preference is given to polyesters, polyolefins, polyamides, polyacrylonitriles, poly(meth)acrylates and polyvinylidene fluorides (PVDFs) and also mixtures thereof. The aforementioned codes for the textile fibers come from German Standard Specification DIN 60001-4 (August 1991).

For further details concerning the concept of textile fibers, reference may be made for example to Römpp Chemielexikon, loc. cit., pages 4477 to 4479, headword: "Textilfasern", whose entire disclosure content, including the references cited therein, is hereby incorporated herein by reference. In particular, the term textile fibers is herein to be understood as a collective designation for all fibers capable of being subjected to textile processing; a feature common to textile fibers is a considerable length in relation to their cross section, and also sufficient strength and flexibility, although textile fibers can be assigned to different groups according to origin or material constitution. In the realm of the present invention, the term "textile fibers" is to be understood as having a very broad and comprehensive meaning, and it comprises not just fibers as such, but also fiberlike structures, for example filaments or the like.

In an embodiment which is preferred according to the present invention, the covering layer in the adsorptive filtering material of the present invention is embodied as a textile fabric, and preferably an air pervious textile material, preferably a laid fabric or a bonded fabric, in particular a nonwoven, which consists of synthetic (manufactured) fibers, wherein the synthetic (manufactured) fibers may preferably be selected from the group of polyamides, polyesters, polyolefins, polyurethanes, polyvinyl and/or polyacrylic, preferably polyolefins (in particular polypropylene) and/or polyesters. It is particularly preferred for the covering layer to be embodied as a nonwoven consisting of synthetic (manufactured) fibers, in particular as a polyolefin nonwoven (for example polypropylene nonwoven) or polyester nonwoven.

In a particular embodiment, the present invention provides as per this aspect of the present invention an adsorptive filtering material with integrated particle and/or aerosol protection and with protective performance with regard to biological and/or chemical noxiants, in particular biological and/or chemical warfare agents, in particular as described above, the adsorptive filtering material having a multilayered construction, the multilayered construction comprising a carrier layer, an adsorptive layer assigned to and preferably fixed to the carrier layer, a covering layer disposed on that side of the adsorptive layer that is remote from the carrier layer, and a particle and/or aerosol filtering layer, in particular a particle and aerosol filtering layer, which is disposed between the adsorptive layer and the covering layer and fixed to the covering layer and/or the absorptive layer, in particular the adsorptive layer preferably by means of lamination or adhering, wherein the particle and/or aerosol filtering layer is embodied as an air pervious textile fabric formed from fibers having fiber diameters in the range from 10 nm to 5 μm, preferably 100 nm to 1.1 μm, and preferably having an areal weight in the range from 1 to 75 g/m$^2$, in particular 2 to 50 g/m$^2$ and more preferably 5 to 15 g/m$^2$, wherein the particle and/or aerosol filtering layer is produced by electrospinning, meltblow process or a combination of these two processes, and wherein the covering layer is embodied as a textile fabric, preferably an air pervious textile material, preferably a laid fabric or a bonded fabric, in particular a nonwoven, which consists of synthetic (manufactured) fibers, wherein the synthetic (manufactured) fibers which form the covering layer are selected from the group of polyamides, polyesters, polyolefins, polyurethanes, polyvinyl and/or polyacrylic, preferably polyolefins and/or polyesters.

To achieve an efficient collection rate in relation to the particles and/or aerosols to be rendered harmless, the particle and/or aerosol filtering layer should have a DIN EN 779 (July 1993) mean natural dust efficiency $E_m$ of at least 40%, in particular at least 50%, preferably at least 70%, more preferably at least 90% and most preferably at least 95%. Furthermore, the particle and/or aerosol filtering layer should have for this purpose a DIN EN 779 (July 1993) mean synthetic dust efficiency $A_m$ of at least 50%, in particular at least 70%, preferably at least 90%, more preferably at least 95% and most preferably at least 99%.

The DIN EN 779 standard of July 1993 concerns the requirements, testing and labeling of particle air filters for general indoor air technology. According to this prescription, the mean synthetic dust efficiency $A_m$ is determined by a gravimetric test method involving repeated dusting of the specimen with a known amount of a standardized artificial test dust in flowing air up to a maximum final pressure drop of 250 Pa, the efficiency being determined in each case from the mass ratios, by weighing a suspended matter filter downstream of the specimen, the mean synthetic dust efficiency $A_m$, calculated from all individual measurements, being applicable; for further details in this regard reference may be made to the text of DIN EN 779. The mean natural dust efficiency $E_m$, by contrast, is measured according to DIN 779 by means of a discoloration test method by repeated measurement of the efficiency with regard to natural atmospheric dust in the air, the specimen having been subjected to a first measurement in the virgin state being loaded with a known amount of standardized artificial test dust in accordance with DIN EN 779 and, thereafter, the efficiency being determined again until a final pressure drop of 450 Pa is reached, the measurement of the efficiency being based on the comparison of those test air volumes which have to be sucked, up- and down-stream the specimen, through a white suspended matter filter paper each until these are equally discolored or cloudy, the mean natural dust efficiency $E_m$, calculated from all individual measurements, being applicable; for further details in this regard reference may be made to the text of DIN EN 779.

To achieve good particle and aerosol collection, moreover, the DIN EN 1822 (April 1989; DEHS aerosol, MPPS=0.1 to 0.3 μm) cumulative initial transmissivity $D_i$ of the particle and/or aerosol filtering layer should be not more than 50%, in particular not more than 40%, preferably not more than 30%, more preferably not more than 20% and most preferably not more than 10%. The test method of DIN EN 1822 is carried out on uncontaminated specimens with a liquid test aerosol (DEHS=diethylhexyl sebacate), based on measurements for a particle diameter which in each case corresponds to the most penetrating particle size MPPS, here: 0.1 to 0.3 μm). In a first step of the investigation, MPPS is determined on flat samples of the filtering medium, the subsequent evaluation and classification of the filters only being done on the basis of the MPPS. In a second step, the integral permeance $D_i$ is then determined, via the blowout area, for the MPPS and the pressure drop of the filter, both in the nominal volume stream. For further details in this regard reference may be made to the text of DIN EN 1822.

Advantageously, the particle and/or aerosol filtering layer is constructed such that it has a mean collection rate of at least 80%, in particular at least 90%, preferably at least 95% with regard to particles and/or aerosols having diameters in the range from 0.1 to 0.3 μm at an inflow speed of 0.1 m/s.

Furthermore, the particle and/or aerosol filtering layer should have a mean collection rate of at least 95%, in particular at least 98%, preferably at least 99% with regard to particles and/or aerosols having diameters $\geq 2$ μm, in particular $\geq 1.5$ μm and preferably $\geq 1.0$ μm at an inflow speed of 0.1 m/s.

The thickness of the particle and/or aerosol filtering layer should be in the range from 0.001 to 10 mm, in particular in the range from 0.1 to 5 mm and preferably in the range from 0.01 to 1 mm.

In a particular embodiment, the particle and/or aerosol filtering layer can be constructed as a high efficiency penetration or particulate air (HEPA) filter or as an ultra low penetration or particulate air (ULPA) filter.

To ensure good gas perviousness, in particular air perviousness, for the present invention's adsorptive filtering material as a whole and thus a high wear comfort on processing into NBC protective suits, the particle and/or aerosol filtering layer should have a good gas perviousness, in particular air perviousness. In general, the gas perviousness, in particular air perviousness, of the particle and/or aerosol filtering layer should be at least 10 $l \cdot m^{-2} \cdot s^{-1}$, in particular at least 30 $l \cdot m^{-2} \cdot s^{-1}$, preferably at least 50 $l \cdot m^{-2} \cdot s^{-1}$, more preferably at least 100 $l \cdot m^{-2} \cdot s^{-1}$ and most preferably at least 400 $l \cdot m^{-2} \cdot s^{-1}$ or more at a flow resistance of 127 Pa.

The adsorptive layer envisaged according to the present invention may be constructed in principle of any desired adsorption-capable material suitable in the realm of the present invention's adsorptive filtering material.

In an embodiment preferred according to the present invention, the adsorptive layer is constructed on the basis of activated carbon, i.e. the adsorption-capable layer comprises or consists of activated carbon. The activated carbon may be present in the form of activated carbon particles and/or activated carbon fibers.

For example, the adsorptive layer may comprise or consist of discrete particles of activated carbon, preferably in granule form ("granulocarbon") or spherical form ("spherocarbon"). In particular, in this case, the average diameter of the activated carbon particles is <1.0 mm, preferably <0.8 mm and more preferably <0.6 mm. The average diameter of the activated carbon particles is in particular at least 0.1 mm. In this embodiment, the activated carbon particles can be used in an amount (i.e. loading or add-on amount) of 10 to 500 g/m$^2$, in particular 25 to 400 g/m$^2$, preferably 50 to 300 g/m$^2$, more preferably 75 to 250 g/m$^2$ and even more preferably 80 to 200 g/m$^2$. In particular, such activated carbon particles are used that have a bursting pressure of 5 newtons, in particular at least 10 newtons, and/or up to 20 newtons, based on an individual particle of activated carbon, in particular activated carbon granule or spherule.

Alternatively, however, the adsorptive layer may also be formed of activated carbon fibers, in particular in the form of an activated carbon fabric, or comprise activated carbon fibers. This embodiment utilizes in particular activated carbon fabrics having areal weights in the range from 10 to 300 g/m$^2$, in particular in the range from 20 to 200 g/m$^2$ and preferably in the range from 30 to 150 g/m$^2$. Useful activated carbon fiber fabrics for the purposes of the present invention include for example woven, loop-formingly knitted, laid or bonded activated carbon fiber fabrics, in particular on the basis of carbonized and activated cellulose and/or on the basis of carbonized and activated acrylonitrile.

It is similarly possible to form the adsorptive layer by combining activated carbon particles on the one hand and activated carbon fibers on the other.

It is preferable according to the present invention when the activated carbon used for forming the adsorptive layer (i.e. the particles or fibers of activated carbon) have an internal surface area (BET) of at least 800 m$^2$/g, in particular of at least 900 m$^2$/g, preferably of at least 1000 m$^2$/g and more preferably in the range from 800 to 2500 m$^2$/g.

To enhance the adsorptive efficiency and adsorptive performance, in particular to obtain an enhanced or improved protective performance also with regard to biological noxiants, in particular biological warfare agents, it is possible for the adsorptive layer, in particular the activated carbon particles and/or the activated carbon fibers, to be impregnated with at least one catalyst. Useful catalysts for the purposes of the present invention include for example enzymes and/or metals, preferably metals, in particular from the group of copper, silver, cadmium, platinum, palladium, rhodium, zinc, mercury, titanium, zirconium and/or aluminum, preferably in the form of the corresponding metal ions. The amount of catalyst can vary within wide limits; in general, it is in the range from 0.05% to 12% by weight, preferably in the range from 1% to 10% by weight and more preferably in the range from 2% to 8% by weight, based on the weight of the adsorptive layer. Any biological noxiants which have permeated through the aerosol and/or particle filtering layer can thereby be rendered harmless in an effective manner.

As written above, the adsorptive layer is fixed or secured to the carrier layer. In general, the securing of the adsorptive layer to the carrier layer is effected by means of an adhesive, which is advantageously applied atop the carrier layer only discontinuously or in point form in order that good gas perviousness, in particular air perviousness, may be retained for the carrier layer and thereby for the adsorptive filtering material as a whole. The adhesive should be applied in an add-on of 10 to 80 g/m$^2$, in particular 20 to 60 g/m$^2$ and preferably 30 to 50 g/m$^2$. Advantageously, the adhesive is applied such that advantageously not more than 50% of the surface of the carrier layer, preferably not more than 40% of the surface of the carrier layer, more preferably not more than 30% of the surface of the carrier layer and most preferably not more than 25% of the surface of the carrier layer is covered with adhesive. In general, the adhesive is applied atop, or printed onto, the carrier layer in the form of a regular or irregular grid in the form of points of adhesive, and subsequently the adsorptive layer (discrete particles of activated carbon for example) are then made to bond at the points of adhesive.

The carrier layer can in principle be any textile fabric, preferably any air pervious textile material. Preference is given to textile wovens, knits, laids or bondeds, in particular nonwovens. In general, the carrier layer has an areal weight of 20 to 200 g/m$^2$, in particular 30 to 150 g/m$^2$ and preferably 40 to 120 g/m$^2$.

The adsorptive filtering material of the present invention is advantageously equipped with a covering layer at its outside surface (i.e., on that side of the particle and/or aerosol filtering layer that is remote from the adsorptive layer), which is advantageously fixed/secured (for example by means of at least sectionwise laminating or adhering) to the particle and/or aerosol filtering layer. The presence of the covering layer leads to an improved wear and tear protection with regard to the particle and/or aerosol filtering layer, for example to an improvement in the wash durability, but also in the donned-state durability of the material of the present invention.

The covering layer optionally envisaged according to the present invention is generally similarly constructed as a textile fabric, preferably an air pervious textile material, for example as a woven, knitted, laid or bonded fabric, in particular a nonwoven. In general, the covering layer has an areal weight of 50 to 300 g/m$^2$, in particular 75 to 275 g/m$^2$, preferably 100 to 250 g/m$^2$ and more preferably 120 to 250 g/m$^2$.

To improve aerosol protection in particular, the covering layer can be, in particular on its outside surface, oleophobicized and/or hydrophobicized, preferably oleophobicized and hydrophobicized, preferably by an appropriate impregnation. In the event that comparatively large drops of noxiant and toxicant agents land on the covering layer, the oleophobicization and/or hydrophobicization of the surface of the covering layer can cause them to become distributed over the surface of the adsorptive filtering material of the present invention. Oleo- and hydrophobicizing agents suitable for this purpose will be well known to one skilled in the art (for example fluoropolymers, such as fluorocarbon resins etc.).

To improve in particular the aerosol protection and the protection with regard to biological noxiants, the covering layer and/or the carrier layer, preferably the carrier layer, may be provided with a biocidal and/or biostatic finish, preferably based on a catalytically active component (cf. commonly assigned German Patent Application DE 10 2005 056 537 and German Utility Model Application DE 20 2005 018 547, whose entire disclosure content in this regard is hereby incorporated herein by reference); especially finishing the carrier layer which serves as a carrier for the adsorptive layer and in the flow direction follows on the covering layer and the aerosol/particle filtering layer, with a biocidally or biostatically effective catalytically active component provides an effective way of rendering harmless any biological noxiants that have succeeded in permeating through the advantageously oleophobicized and/or hydrophobicized covering layer and the, in the flow direction, subsequent aerosol and/or particle filtering layer. For example, toxic spores may also be rendered harmless or killed in this way, and the problem of any possible reaerosolization is also counteracted efficiently. The biocidally or biostatically effective catalytically active component may be in particular incorporated in the covering and/or carrier layers, each preferably constructed as a textile fabric, preferably only in the carrier layer, in particular in the fibers, threads, yarns, filaments or the like that form the fabric, examples of the incorporating being spinning, extruding, impregnating, chemical and plasmachemical treating processes or the like. Useful biocidally or biostatically effective catalytically active components include in particular metals or metal compounds, in particular from the group of copper, silver, cadmium, platinum, palladium, rhodium, zinc, mercury, titanium, zirconium and/or aluminum and also their ions and/or salts, preferably copper and silver and also their ions and/or salts, more preferably from the group of Ag, $Ag_2O$, Cu, $Cu_2O$ and CuO and also mixtures thereof. The amount of catalytically active component, based on the overall layer, can vary in the range from 0.001% to 20% by weight, in particular in the range from 0.005% to 10% by weight and preferably in the range from 0.01% to 5% by weight. Textile fabrics useful for the purposes of the present invention as having a catalytically active component with a biostatic or biocidal action applied to them are commercially available, for example from Cupron Corporation, New York (USA), Foss Manufacturing Company Inc., Hampton, N.H. (USA) or Noble Fiber Technologies, Clarks Summit, Pa. (USA).

Similarly, to improve particularly the aerosol protection and the protection with regard to biological noxiants—alternatively or else cumulatively to the covering layer and/or the carrier layer—the aerosol and/or particle filtering layer may also be provided with a biocidal and/or biostatic additization/endowment, preferably on the basis of a catalytically active component; the above recitations concerning the biocidal and/or biostatic additization/endowment of the covering layer and/or the carrier layer apply mutatis mutandis (cf. also the commonly as signed German Patent Application DE 10 2005 056 537 and German Utility Model Application DE 20 2005 018 547, the entire disclosure content in this respect is hereby incorporated herein by reference). The biocidally/biostatically efficacious catalytically active component may be incorporated into the aerosol and/or particle filtering layer in particular, more particularly into the fibers, threads, yarns, filaments or the like that form the aerosol and/or particle filtering layer, for example by spinning, extrusion, impregnation processes, chemical or plasmachemical treating processes or the like. Useful biocidally/biostatically efficacious catalytically active components include in particular metals or metal compounds, in particular from the group of copper, silver, cadmium, platinum, palladium, rhodium, zinc, quicksilver, titanium, zirconium and/or aluminum and also their ions and/or salts, preferably copper and silver and also their ions and/or salts, more preferably from the group of Ag, $Ag_2O$, Cu, $Cu_2O$ and CuO and also their mixtures. The amount of catalytically active component, based on the total layer, can vary in the range from 0.001% to 20% by weight, in particular from 0.005% to 10% by weight and preferably from 0.01% to 5% by weight.

The covering layer may further be rendered flame retardant (by means of phosphoric ester impregnation for example). The covering layer may also be rendered antistatic. In a further embodiment, the covering layer may also have infrared (IR) reflective properties. Finally, the covering layer may also be provided with a camouflage print, in particular when used to produce NBC protective suits, on its noxiant-facing side (i.e. on the outside surface in the use state).

In general, the carrier layer and/or the covering layer may be a textile fabric consisting of natural and/or synthetic fibers, preferably of synthetic (manufactured) fibers. Synthetic (manufactured) fibers useful for forming the covering layer and/or carrier layer are for example selected from the group of polyamides, polyesters, polyolefins (for example polyethylenes or polypropylenes), polyurethanes, polyvinyl and/or polyacrylic.

In an embodiment which is preferred according to the present invention, specifically the covering layer may be embodied as a textile fabric, preferably an air pervious textile material, preferably a laid fabric or bonded fabric, in particular a nonwoven, which consists of synthetic (manufactured) fibers. The synthetic (manufactured) fibers may be selected in particular from the group of polyamides, polyesters, polyolefins, polyurethanes, polyvinyl and/or polyacrylic, preferably polyolefins and/or polyesters. The covering layer is preferably embodied as a nonwoven consisting of synthetic (manufactured) fibers, in particular as a polyolefin nonwoven or polyester nonwoven.

As well as the aforementioned layers, the adsorptive filtering material of the present invention may contain still other layers, in particular textile plies. These can be disposed above, below or between the aforementioned layers.

As written above, the adsorptive filtering material of the present invention is gas pervious, in particular air pervious, and/or water pervious and/or water vapor pervious. This provides excellent wear comfort on processing into NBC protective suits.

In general, the adsorptive filtering material of the present invention has a gas or air transmission rate of at least 10 $l \cdot m^{-2} \cdot s^{-1}$, in particular at least 30 $l \cdot m^{-2} \cdot s^{-1}$, preferably at least 50 $l \cdot m^{-2} \cdot s^{-1}$, more preferably at least 100 $l \cdot m^{-2} \cdot s^{-1}$ and most preferably at least 400 $l \cdot m^{-2} \cdot s^{-1}$, and/or up to 10 000 $l \cdot m^{-2} \cdot s^{-1}$ at a flow resistance of 127 Pa. Since the gas or air perviousness of the adsorptive filtering material according to the present invention is at least essentially determined or restricted by the aerosol and/or particle filtering layer, the gas or air perviousness of the adsorptive filtering material of the present invention as a whole corresponds essentially to the gas or air perviousness of the aerosol and/or particle filtering layer.

In general, the adsorptive filtering material of the present invention has an overall areal weight in the range from 200 to 1000 $g/m^2$, in particular in the range from 225 to 800 $g/m^2$, preferably in the range from 250 to 600 $g/m^2$ and more preferably in the range from 300 to 500 $g/m^2$, in particular when coupled with an overall cross-sectional thickness of 0.1 to 10 mm, in particular 0.2 to 5 mm and preferably 0.5 to 3.0 mm for the adsorptive filtering material of the present invention.

To enhance the wear comfort on processing of the adsorptive filtering material of the present invention into NBC protective apparel, the adsorptive filtering material of the present invention should have a water vapor transmission rate of at least 5 $l/m^2$ per 24 h, in particular at least 10 $l/m^2$ per 24 h, preferably at least 15 $l/m^2$ per 24 h, more preferably at least 20 $l/m^2$ per 24 h and most preferably at least 25 $l/m^2$ per 24 h. The water vapor transmission rate can be measured by the inverted cup method of ASTM E 96 and at 25° C. For further details concerning the measurement of the water vapor transmission rate (WVTR) reference is made to McCullough et al. "A Comparison of Standard Methods for Measuring Water Vapour Permeability of Fabrics" in *Meas. Sci. Technol. [Measurements Science and Technology]*, 14, 1402-1408, August 2003. This ensures good wear comfort.

To ensure a good protective effect with regard to chemical warfare agents, the adsorptive filtering material of the present invention generally has a barrier effect with regard to chemical warfare agents, in particular bis[2-chloroethyl] sulfide (also known as mustard gas, Hd or Yellow Cross), determined by method 2.2 of CRDEC-SP-84010, permitting permeation of not more than 4 µg/cm$^2$ per 24 h, in particular not more than 3.5 µg/cm$^2$ per 24 h, preferably not more than 3.0 µg/cm$^2$ per 24 h and more preferably not more than 2.5 µg/cm$^2$ per 24 h.

Further advantages, properties, aspects and features of the present invention will become apparent from the following description of an illustrative embodiment depicted in the sole FIGURE, where FIGURE shows a schematic sectional depiction through the layered construction of an inventive adsorptive filtering material in accordance with an embodiment of the present invention whereby the adsorptive layer is formed of discrete adsorber particles, in particular activated carbon particles.

The sole FIGURE shows a schematic sectional depiction through the layered construction 2 of an inventive adsorptive filtering material 1 corresponding to a specific embodiment of the present invention. The inventive adsorptive filtering material 1 according to the present invention, which is equipped both with an integrated particle and/or aerosol protection but also with a protective function with regard to biological and/or chemical noxiants, in particular biological and/or chemical warfare agents, has a multilayered construction 2 comprising a carrier layer 3, an adsorptive layer 4 assigned to and preferably fixed to the carrier layer 3, and a covering layer 5 disposed on that side of the adsorptive layer 4 that is remote from the carrier layer 3. In addition, the adsorptive filtering material 1 is equipped with a particle and/or aerosol filtering layer 6, preferably a combined particle and aerosol filtering layer 6. Such an adsorptive filtering material 1 is subject matter of German Patent Application DE 10 2006 021 905.8.

In further development of the subject matter of German Patent Application DE 10 2006 021 905.8, the inventive adsorptive filtering material 1 comprises the particle and/or aerosol filtering layer 6 embodied as an air pervious textile fabric formed from fibers having fiber diameters in the range from 10 nm to 5 µm, preferably 100 nm to 1.1 µm, and preferably having an areal weight of 1 to 75 g/m$^2$, in particular 2 to 50 g/m$^2$, or preferably 5 to 15 g/m$^2$.

The particle and/or aerosol filtering layer 6 is generally disposed directly on the adsorptive layer 4, in particular fixed on and/or to the adsorptive layer 4, preferably laminated thereon. The particle and/or aerosol filtering layer 6 is thus disposed between the adsorptive layer 4 and the covering layer 5, the particle and/or aerosol filtering layer 6 advantageously being fixed on and/or to the adsorptive layer 4, preferably by means of lamination. In the use state, the noxiants, including the aerosols and particles, that are to be rendered harmless thus initially, after passing through the outer covering layer 5, impinge on the particle and/or aerosol filtering layer 6 where the noxiant particles and aerosols in question are rendered harmless, and the noxiant stream which may still contain chemical and/or biological noxiants after it has been freed of the particles and aerosols then finally impinges on the adsorptive layer 4, where the remaining noxiants are then rendered harmless by adsorptive processes and, in the case of the presence of catalysts, additionally also by decomposition processes.

In general, the particle and/or aerosol filtering layer 6 is embodied as a laid fabric or a bonded fabric, in particular a nonwoven and more preferably as a nonwoven. It is preferable when the particle and/or aerosol filtering layer 6 is produced by electrospinning, meltblow process or a combination of these two processes.

For further details in this regard concerning the inventive adsorptive filtering material 1 in accordance with the illustrative embodiment depicted in the sole FIGURE, in order to avoid unnecessary repetition, reference can be made to the above observations in the general description section, which observations apply accordingly with respect to the depiction of the FIGURE.

The present invention further provides for the use of the present invention's adsorptive filtering material as previously described for producing protective materials of any kind (i.e. protective materials both with integrated particle and/or aerosol protection and also with protective performance with regard to biological and/or chemical noxiants, in particular biological and/or chemical warfare agents), in particular protective apparel, in particular for the civil or military sector, such as protective suits, protective gloves, protective shoewear, protective socks, head protective apparel and the like, and of protective coverings of any kind, preferably all aforementioned protective materials for NBC deployment.

The present invention further provides for the use of the present invention's adsorptive filtering material as previously described for producing filters and filtering materials of any kind, in particular for removing noxiant, odorant and toxicant entities of any kind, in particular from air and/or gas streams, such as NBC respirator filters, odor filters, sheet filters, air filters, in particular filters for indoor air cleaning, adsorption-capable support structures and filters for the medical sector.

The present invention also provides the aforementioned protective materials of any kind themselves (i.e. protective materials both with integrated particle and/or aerosol protection and also with protective performance with regard to biological and/or chemical noxiants, in particular biological and/or chemical warfare agents), in particular for the civil or military sector, in particular protective apparel, such as protective suits, protective gloves, protective shoewear, protective socks, head protective apparel and the like, and protective coverings, produced using the adsorptive filtering material according to the present invention and/or comprising the adsorptive filtering material according to the present invention, preferably all aforementioned protective materials for NBC deployment.

The present invention finally further provides filters and filtering materials of any kind, in particular for removing noxiant, odorant and toxicant agents of any kind, in particular from air and/or gas streams, such as NBC respirator filters, odor filters, sheet filters, air filters, in particular filters for indoor air cleaning, adsorption-capable support structures and filters for the medical sector, produced using the material according to the present invention and/or comprising the adsorptive filtering material according to the present invention.

For further details concerning the above-described uses according to the present invention and concerning the above-described articles according to the present invention, reference can be made to the above observations concerning the present invention's adsorptive filtering material which apply mutatis mutandis in relation to the uses according to the present invention and the articles according to the present invention.

Further embodiments, modifications and variations of the present invention are readily discernible and realizable for those skilled in the art on reading the description without their having to leave the realm of the present invention.

The present invention will now be illustrated with reference to the following operative example which, however, shall not restrict the present invention in any way.

OPERATIVE EXAMPLE

One inventive adsorptive filtering material with integrated particle and aerosol filtering layer is produced in the form of a nonwoven fabric.

The adsorptive filtering material is produced by printing a textile carrier layer having an areal weight of about 95 g/m² with about 38 g/m² of an adhesive in the form of a point grid, to which adhesive activated carbon spherules having average diameters of about 0.4 mm are subsequently made to bond in an add-on amount of about 165 g/m². After crosslinking and curing the adhesive, a particle and aerosol filtering layer in the form of a nonwoven consisting of polyamide filaments or fibers having a fiber diameter of about 125 nm (areal weight: about 15 g/m²; pore diameter: about 25 μm; air perviousness: about 380 $l \cdot m^{-2} \cdot s^{-1}$ at a flow resistance of 127 Pa), which is produced in the electrospinning process, is laminated onto the adsorptive layer. The ratio of the average pore size of the nonwoven to the average diameter of the textile fibers or filaments is about 200.

An air pervious polyolefin (PO) nonwoven (areal weight: about 38 g/m²) is subsequently secured on the particle and/or aerosol filtering layer, by means of a hot-melt adhesive web, as covering layer which functions as outer layer and serves as wear and tear protection.

Subsequently, the barrier effect with regard to mustard gas is determined by method 2.2 of CRDEC-SP-84010 as part of the convective flow test. For this purpose, an air stream containing mustard gas is allowed to flow at a constant flow resistance and at a flow velocity of about 0.45 cm/s against the adsorptive filtering material while the area-specific breakthrough quantity is determined after 16 hours (80% relative humidity, 32° C.). The breakthrough amount in relation to mustard gas is distinctly below 3 μg/cm², so that the adsorptive filtering material exhibits good protective performance with regard to chemical warfare agents.

Subsequently, the adsorptive filtering material is tested for its DIN EN 779 (July 1993) mean natural dust efficiency $E_m$ and for its DIN EN 779 (July 1993) mean synthetic dust efficiency $A_m$. The DIN EN 779 mean natural dust efficiency $E_m$ is about 95%, and the DIN EN 779 (July 1993) mean synthetic dust efficiency $A_m$ is about 98%. This shows that the inventive adsorptive filtering material provides good particle and aerosol protection.

The inventive adsorptive filtering material is further tested for its DIN EN 1822 (April 1998; DEHS aerosol, MPPS=0.1 to 0.3 μm) cumulative initial transmissivity $D_i$. The cumulative initial transmissivity $D_i$ is about 3%.

The inventive adsorptive filtering material, moreover, has a collection rate of above 98% with regard to particles and aerosols having diameters $\geqq$1 μm.

The adsorptive filtering material is subsequently subjected to five wash cycles and subsequently the aforementioned measurements are repeated. Similar results are obtained; that is, the adsorptive filtering material of the present invention is durable to wear and tear and is readily regenerable by washing without efficiency being impaired.

The invention claimed is:

1. An adsorptive filtering material having integrated particle and aerosol protection and protective performance with regard to biological and chemical noxiants and warfare agents, the adsorptive filtering material having a multilayered construction, the multilayered construction comprising:

a support layer, an adsorptive layer associated to and fixed to the support layer, optionally a covering layer disposed on that side of the adsorptive layer that is remote from the support layer, and a particle and aerosol filtering layer, wherein the particle and aerosol filtering layer is provided as an air-pervious textile fabric consisting of textile fibers having fiber diameters in the range of from 10 nm to 1,000 nm and having an areal weight in the range of from 1 to 50 g/$m^2$ and having pores and meshes bounded by the textile fibers, wherein the ratio of the average pore size or mesh size to the average diameter of the textile fibers is in the range of from 10 to 500 and wherein the textile fabric is produced by electrospinning, meltblow process or a combination of these two processes.

2. The adsorptive filtering material according to claim 1, wherein the particle and aerosol filtering layer is disposed directly on and is fixed to or on the adsorptive layer.

3. The adsorptive filtering material according to claim 1, wherein the particle and aerosol filtering layer is disposed between the adsorptive layer and the covering layer.

4. The adsorptive filtering material according to claim 3, wherein the particle and aerosol filtering layer is fixed on and to the adsorptive layer only or, alternatively, on or to the covering layer only or, further alternatively, both on or to the covering layer and the adsorptive layer.

5. The adsorptive filtering material according to claim 1, wherein the particle and aerosol filtering layer is provided as a laid fabric, a bonded fabric or a nonwoven.

6. The adsorptive filtering material according to claim 1, wherein the textile fabric has an average pore or mesh size of not more than 200 μm.

7. The adsorptive filtering material according to claim 1, wherein the textile fabric has an average pore or mesh size of not more than 10 μm.

8. The adsorptive filtering material according to claim 1, wherein the ratio of the average pore or mesh size to the average diameter of the textile fibers is in the range from 10 to 350.

9. The adsorptive filtering material according to claim 1, wherein the ratio of the average pore or mesh size to the average diameter of the textile fibers is in the range from 25 to 250.

10. The adsorptive filtering material according to claim 1, wherein the textile fibers used are synthetic fibers.

11. The adsorptive filtering material according to claim 10, wherein the synthetic fibers used are from the group consisting of polyesters (PES); polyolefins; polyoxyethylene and polyoxypropylene; polyvinyl chlorides (CLF); polyvinylidene chlorides (CLF); acetates (CA); triacetates (CTA); polyacrylic (PAN); polyacrylonitriles; polyamides (PA); polyvinyl alcohol (PVAL); polyurethanes; polyvinyl esters; poly(meth)acrylates; polyvinylidene fluorides (PVDFs); and mixtures thereof.

12. The adsorptive filtering material according to claim 1, wherein the particle and aerosol filtering layer has a mean natural dust efficiency $E_m$ of at least 90%, as determined according to DIN EN 779 (July 1993).

13. The adsorptive filtering material according to claim 1, wherein the particle and aerosol filtering layer has a mean synthetic dust efficiency $A_m$ of at least 90%, as determined according to DIN EN 779 (July 1993).

14. The adsorptive filtering material according to claim 1, wherein the particle and aerosol filtering layer has a cumulative initial transmissivity $D_i$ of not more than 10%, as determined according DIN EN 1822 (April 1998; DEHS aerosol, MPPS=0.1 to 0.3 μm).

15. The adsorptive filtering material according to claim 1, wherein the particle and aerosol filtering layer has a mean collection rate of at least 95% with regard to particles and aerosols having diameters in the range from 0.1 to 0.3 µm at an inflow speed of 0.1 m/s.

16. The adsorptive filtering material according to claim 1, wherein the particle and aerosol filtering layer has a mean collection rate of at least 99% with regard to particles and aerosols having diameters 2 µm at an inflow speed of 0.1 m/s.

17. The adsorptive filtering material according to claim 1, wherein the particle and aerosol filtering layer has a thickness in the range of from 0.001 to 10 mm.

18. The adsorptive filtering material according to claim 1, wherein the particle and aerosol filtering layer has a thickness in the range of from 0.01 to 1 mm.

19. Protective apparel, the protective apparel comprising the adsorptive filtering material according to claim 1.

20. The protective apparel of claim 19, wherein the protective apparel comprises protective apparel for use in the civil or military sector.

21. A filtering device for removing noxiant, odorant and toxicant entities from air and gas streams, the filter comprising the adsorptive filtering material according to claim 1.

* * * * *